F. T. TERRY.
TOBACCO SPEARING MACHINE.
APPLICATION FILED NOV. 26, 1909.
1,071,654.
Patented Aug. 26, 1913.
2 SHEETS—SHEET 1.
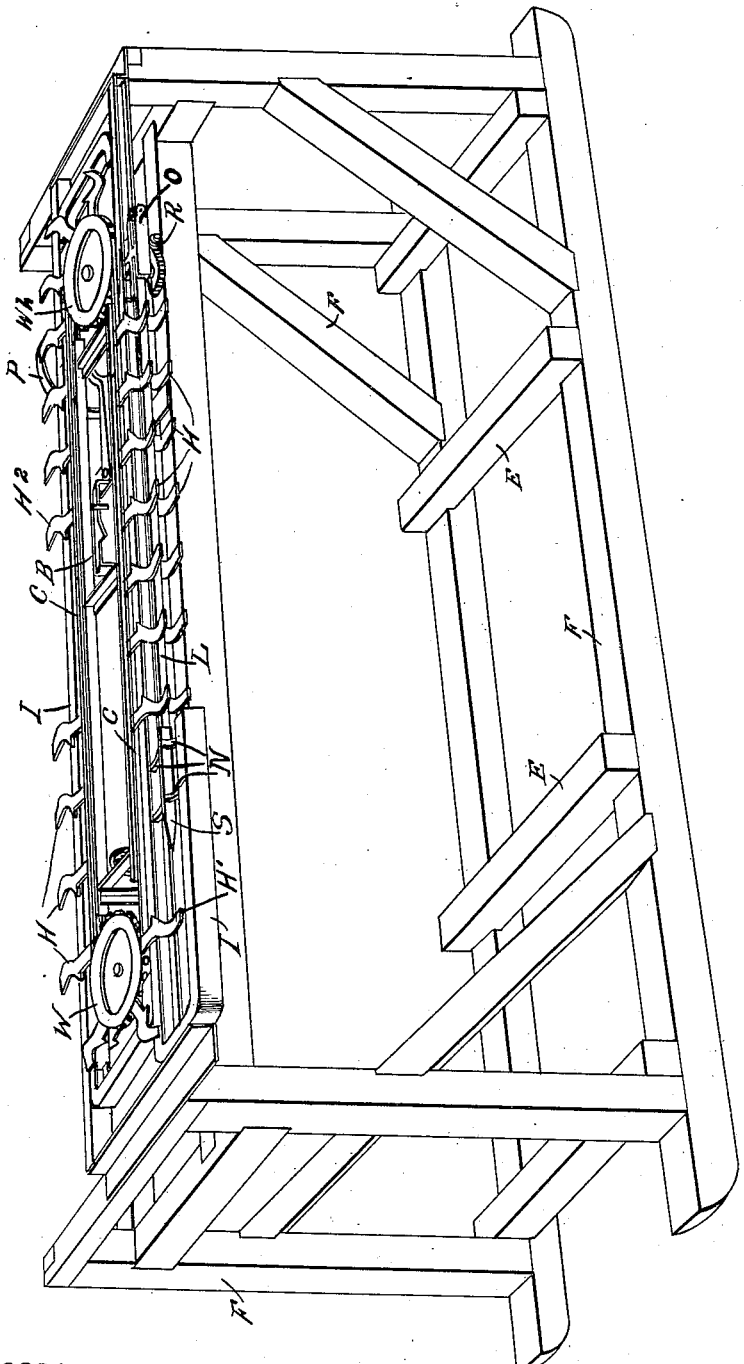

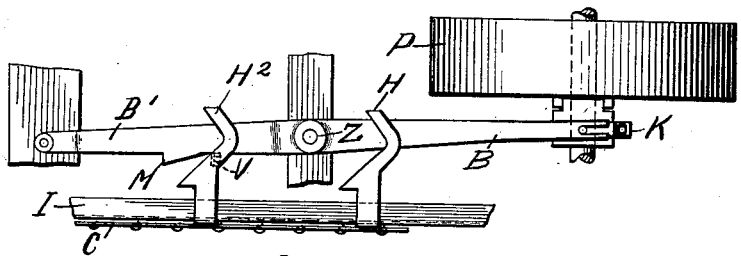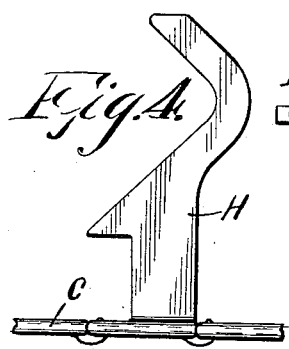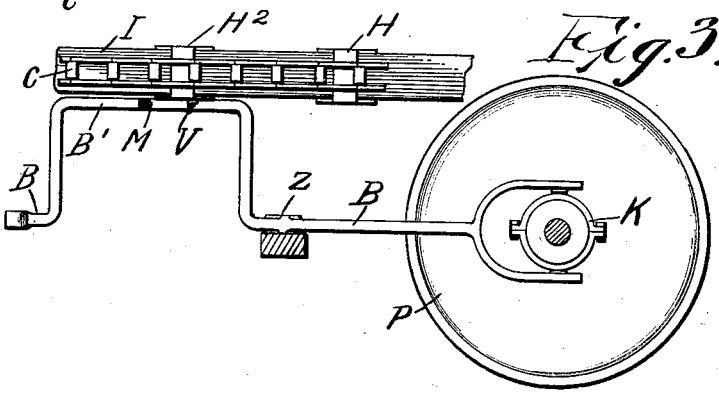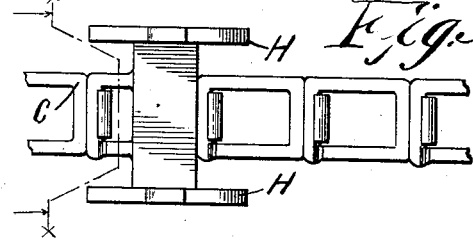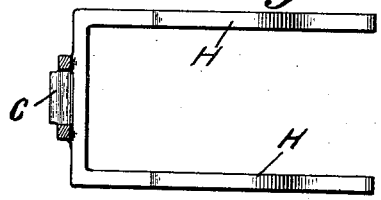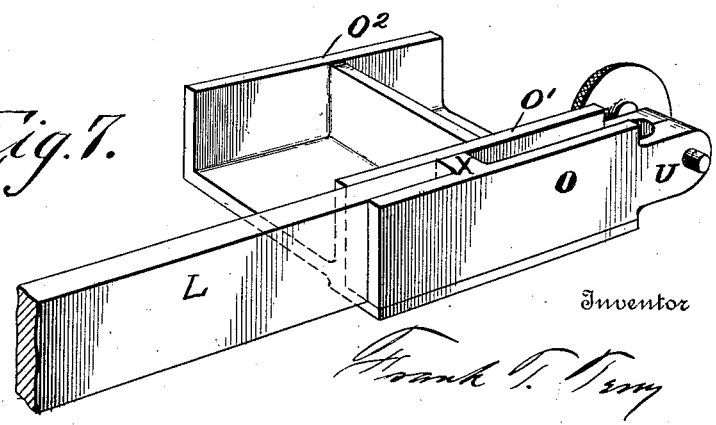

UNITED STATES PATENT OFFICE.

FRANK T. TERRY, OF MILWAUKEE, WISCONSIN.

TOBACCO-SPEARING MACHINE.

1,071,654.

Specification of Letters Patent. Patented Aug. 26, 1913.

Application filed November 26, 1909. Serial No. 530,041.

*To all whom it may concern:*

Be it known that I, FRANK T. TERRY, of Milwaukee, in the county of Milwaukee, in the State of Wisconsin, have invented a Tobacco-Spearing Machine, of which the following is a specification.

My invention consists of a device for automatically spearing tobacco plants, or, in other words, of stringing them upon a lath at separated intervals so that they may dry or cure. On each lath a certain number of plants have to be placed at regular intervals apart, the lath piercing the stem of the plants.

The object of my invention is to produce a machine capable of performing the aforesaid operation automatically, the plants as they are presented to the machine being taken by it and spread at even distances apart and the machine stopping automatically as soon as the lath in the machine has received the proper number of plants. I further aim to provide means for stopping the machine at any time during the operation.

My invention consists generally of a spear which forms a continuation of and support for one end of the lath, an endless chain with projecting hooks adapted to take each plant presented to it, impale said plant upon said spear head and push it to its proper place on the lath, means for supporting said spear so as to permit it to pass through the stems of the plants without interrupting its support, automatic means for stopping the machine when the required number of plants are in their proper places on the lath, manual means for starting and stopping the machine.

My invention comprises further the constructions and combinations hereinafter specifically described and set forth in the claims accompanying these specifications.

Figure 1 is a perspective view of the entire machine. Fig. 2 is a plan view in detail of mechanism for automatically stopping the machine when lath is filled. Fig. 3 is a side elevation of said detail. Fig. 4 is a plan view of section of chain with hook. Fig. 5 is a side elevation of said detail. Fig. 6 is a view of the double hook from its front, looking at its concave side in line parallel with the chain. Fig. 7 is a perspective detail of the bracket containing the slot that holds the butt end of the lath.

F F F is the wooden frame work of the machine, the base of which is two longitudinal beams which may be placed on wheels or shod with sheet iron to enable them more readily to move on the ground.

E E are two cross beams on which the gasolene engine may rest.

P is the pulley to be belted to said engine.

R is the worm gear transmitting the power from pulley to wheel W$h$.

B B B is the bar or rod by which the clutch is moved in to engage the pulley or out to disengage it when the machine is stopped. It is controlled by a hand lever at the left of the spear S and also by the projecting lug on some of the chain links that stops the machine when a lath is filled. In Figs. 2 and 3 the bar B B swings on the pivot Z. It is bent upward so that at B' it nearly touches the chain C and hooks H. Here on its inner side it has a wedge shaped projection M with gently inclined slope in the direction from which the hooks come. The third hook in each set of seven has a lug V projecting downward that encounters the wedge projection M, pressing it outward so that the bar B B' B swings on the pivot Z and the clutch K is thus moved away from the pulley P, and the machine is thus stopped. This happens each time that one of the three sets of seven hooks has reached the required position along the lath.

W and W$h$ are two sprocket wheels connected by an endless chain C so that when W$h$ is revolved by the worm gear the chain moves and the wheel W is also made to revolve.

H H H are hooks attached to the endless chain or rather are part of it as they are projections from some of the links. The hooks are double—each hook shown on the plan having another hook 2½ inches below it, both being parts of the same link of the chain.

I is a bar of channel iron along which the chain runs. The left hand end of this bar is bent back to parallel itself for about one-third of its length.

N N are metal fingers attached to it with a spring.

S is the spear head held in place by the fingers N.

L is the lath one end of which is inserted in the spear and the other end in the slot O.

Fig. 7 is a detail of the slot device. L is the butt end of the lath extending into the slot to the cross-piece X. O is the outer side of the slot revolving on the pivot U so that it can be raised and the lath when filled can be pulled directly forward and thus its other end released from the slot in the spear without even touching the hooks that have stopped above and below the lath.

O' is the inner side of the slot that is fastened to the bottom piece, and also by the cross bar to the base of the slot $O^2$ which is riveted to the channel iron I. D is a screw and wheel for moving the sprocket wheel W and thus tightening or loosening the chain.

A tobacco plant is held against the inside angle of the hook when it is before the spear S as at $H_1$. The angle of the hook is on a line with the point of the spear and as the upper and lower hook pass along above and below the spear, the plant's stem is pierced in its center and is pushed along to within 4 inches of the other end of the lath.

The two pairs of metal fingers N N that support the spear on both sides are pivotally mounted on pins on the adjacent frame bar and by means of wire springs at the pivots are pressed into grooves in the sides of the spear. They are such a distance apart that when the plant has reached the second pair, the first pair has sprung back into original position, holding the spear. Meanwhile as soon as the next hook reached the position of $H_1$ another plant was held against it and its stem was speared and slipped along the lath $6\frac{1}{2}$ inches behind the first, and other plants were successively held and impaled till there are seven upon the lath at exactly the proper distance apart. At this point the hook with the projecting lug has reached the position $H_2$ when it moves the bar B so as to disengage the clutch and stop the machine. The lath L is then released by moving a little thumb clamp at O, taken from the machine and placed upon the rack. Another is inserted, the mechanism started, and seven plants strung as before.

Having thus described my invention, what I claim as new and desire to secure by Letters Patent is:

1. A machine of the class described comprising in conjunction with a member on which a plurality of plants are adapted to be impaled, an endless chain device and projections therefrom adapted to impale plants on said member in such a way that each successive plant will be a less distance along said member than the preceding plant and means for automatically stopping said device as soon as a predetermined quota of plants has been placed upon said member.

2. A machine of the class described comprising a member having a point on the end of it on which plants are adapted to be impaled, an endless chain adapted to impale plants on said member, means for supporting said member in the line of travel of said endless chain device, hooks on said endless chain adapted to press the stems of plants against said pointed member until they are speared and carried the proper distance along said pointed member at proper distances apart and means for automatically stopping the machine when the plants have reached their proper places.

3. A machine of the class described in conjunction with a lath and a point at one end of it, means for supporting said lath an endless chain moving over a path in line with said lath and having horizontal hooks projecting above and below said lath adapted to press the stems of plants against the point of said lath and push them along said lath till all occupy the desired position on said lath and means for then automatically stopping said machine.

4. A machine of the class described in conjunction with a lath and means for supporting it, an endless chain, moving in a horizontal elliptical circle having hooks projecting outwardly and horizontally from it at suitable intervals apart according to the spaces desired for the plants on the lath and having a greater distance between the last hook that completes the quota for the lath and the next hook.

FRANK T. TERRY.

Witnesses:
ANDREW LAAS,
JOHN G. LEE.

---

Copies of this patent may be obtained for five cents each, by addressing the "Commissioner of Patents, Washington, D. C."